US012795066B2

(12) United States Patent
Huang

(10) Patent No.: US 12,795,066 B2
(45) Date of Patent: Nov. 10, 2026

(54) VIDEO ENCODING METHOD AND SYSTEM, AND VIDEO DECODING METHOD AND SYSTEM

(71) Applicant: Cupola360 INC., Hsinchu City (TW)

(72) Inventor: Keng-Yen Huang, Hsinchu City (TW)

(73) Assignee: Cupola360 INC., Hsinchu City (TW)

( * ) Notice: Subject to any disclaimer, the term of this patent is extended or adjusted under 35 U.S.C. 154(b) by 174 days.

(21) Appl. No.: 18/429,452

(22) Filed: Feb. 1, 2024

(65) Prior Publication Data

US 2025/0254287 A1 Aug. 7, 2025

(51) Int. Cl.
*H04N 19/00* (2014.01)
*G11B 27/00* (2006.01)

(52) U.S. Cl.
CPC .................................. *H04N 19/00* (2013.01)

(58) Field of Classification Search
CPC ........ H04N 19/00; G11B 27/10; G11B 27/00; G11B 27/036
USPC ......................... 386/278, 282, 286, 239, 248
See application file for complete search history.

(56) References Cited

U.S. PATENT DOCUMENTS

2015/0208037 A1 7/2015 Maurice
2016/0314819 A1* 10/2016 Elsner .................... H04N 19/46
2018/0270287 A1* 9/2018 Ouedraogo .......... H04N 19/103
2020/0294188 A1* 9/2020 Tsukagoshi .... H04N 21/234363
2022/0046186 A1* 2/2022 Fayad .................... H04N 5/272

OTHER PUBLICATIONS

"Office Action of Taiwan Counterpart Application", issued on Aug. 27, 2024, p. 1-p. 10.

* cited by examiner

*Primary Examiner* — Daquan Zhao
(74) *Attorney, Agent, or Firm* — JCIPRNET

(57) ABSTRACT

A video encoding method and system, and a video decoding method and system are provided. A video is obtained, and the video includes multiple images. The first image of the images is reduced in size to generate a size-reduced image. Part or all of the first image is encoded to generate an original image encoded stream. The size-reduced image is encoded to generate a size-reduced image encoded stream. The original image encoded stream and the size-reduced image encoded stream are encapsulated into a video stream. Therefore, it could be applied to situations where the viewing angle changes.

17 Claims, 11 Drawing Sheets

VIDEO ENCODING METHOD AND SYSTEM, AND VIDEO DECODING METHOD AND SYSTEM

BACKGROUND

Technical Field

The present disclosure generally relates to a video encoding method and system, and a video decoding method and system.

Description of Related Art

During the process of panorama or 360-degree video streaming, the camera transmits the captured panorama or 360-degree video to the server, and the server allocates the corresponding video content based on the viewing angle of the terminal. Generally speaking, when the viewing angle changes, the server needs to re-provide the corresponding video content based on this change. However, when network bandwidth is limited, it may be difficult for the server to cope with the following two scenarios at the same time: small viewing angle changes and drastic viewing angle changes.

SUMMARY

The present disclosure is directed to a video encoding method and system, and a video decoding method and system, which could cope with the above-mentioned situations.

According to one or more exemplary embodiments of the disclosure, a video encoding method includes but is not limited to, the following steps: obtaining a video, and the video comprises multiple images; reducing the size of a first image of the images, to generate a size-reduced image; encoding a part or all of the first image, to generate an original image encoded stream; encoding the size-reduced image, to generate a size-reduced image encoded stream; and encapsulating the original image encoded stream and the size-reduced image encoded stream into a video stream.

According to one or more exemplary embodiments of the disclosure, a video decoding method includes but is not limited to, the following steps: obtaining a video stream, where the video stream includes an original image encoded stream and a size-reduced image encoded stream, the original image encoded stream is generated by encoding a part or all of a first image, the size-reduced image encoded stream is generated by encoding a size-reduced image, and the size-reduced image is generated by reducing a size of the first image; obtaining a viewing angle; and decoding at least one of the original image encoded stream and the size-reduced image encoded stream according to a change of the viewing angle.

According to one or more exemplary embodiments of the disclosure, a video encoding system includes one or more memories and one or more processors. The memory is used for storing one or more program codes. The processor is coupled to the memory. The processor is configured to execute the program code and perform: obtaining a video, and the video comprises multiple images; reducing the size of a first image of the images, to generate a size-reduced image; encoding a part or all of the first image, to generate an original image encoded stream; encoding the size-reduced image, to generate a size-reduced image encoded stream; and encapsulating the original image encoded stream and the size-reduced image encoded stream into a video stream.

According to one or more exemplary embodiments of the disclosure, a video decoding system includes a communication transceiver, one or more memories, and one or more processors. The communication transceiver is used for receiving or transmitting data. The memory is used for storing one or more program codes. The processor is coupled to the memory. The processor is configured to execute the program code and perform: obtaining a video stream through the communication transceiver, where the video stream includes an original image encoded stream and a size-reduced image encoded stream, the original image encoded stream is generated by encoding a part or all of a first image, the size-reduced image encoded stream is generated by encoding a size-reduced image, and the size-reduced image is generated by reducing a size of the first image; obtaining a viewing angle; and decoding at least one of the original image encoded stream and the size-reduced image encoded stream according to a change of the viewing angle.

Based on the above, the video encoding method and system, and the video decoding method and system of one or more exemplary embodiments of the disclosure may provide the original image encoded stream corresponding to the original size and the size-reduced image encoded stream corresponding to the reduced size at the encoding side, and decode the original image encoded stream and/or the size-reduced image encoded stream according to the change of the viewing angle at the decoding side. Accordingly, the requirement for changing the viewing angle could be met, the usage of bandwidth could be saved, and appropriate images could be provided to terminal devices in time.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
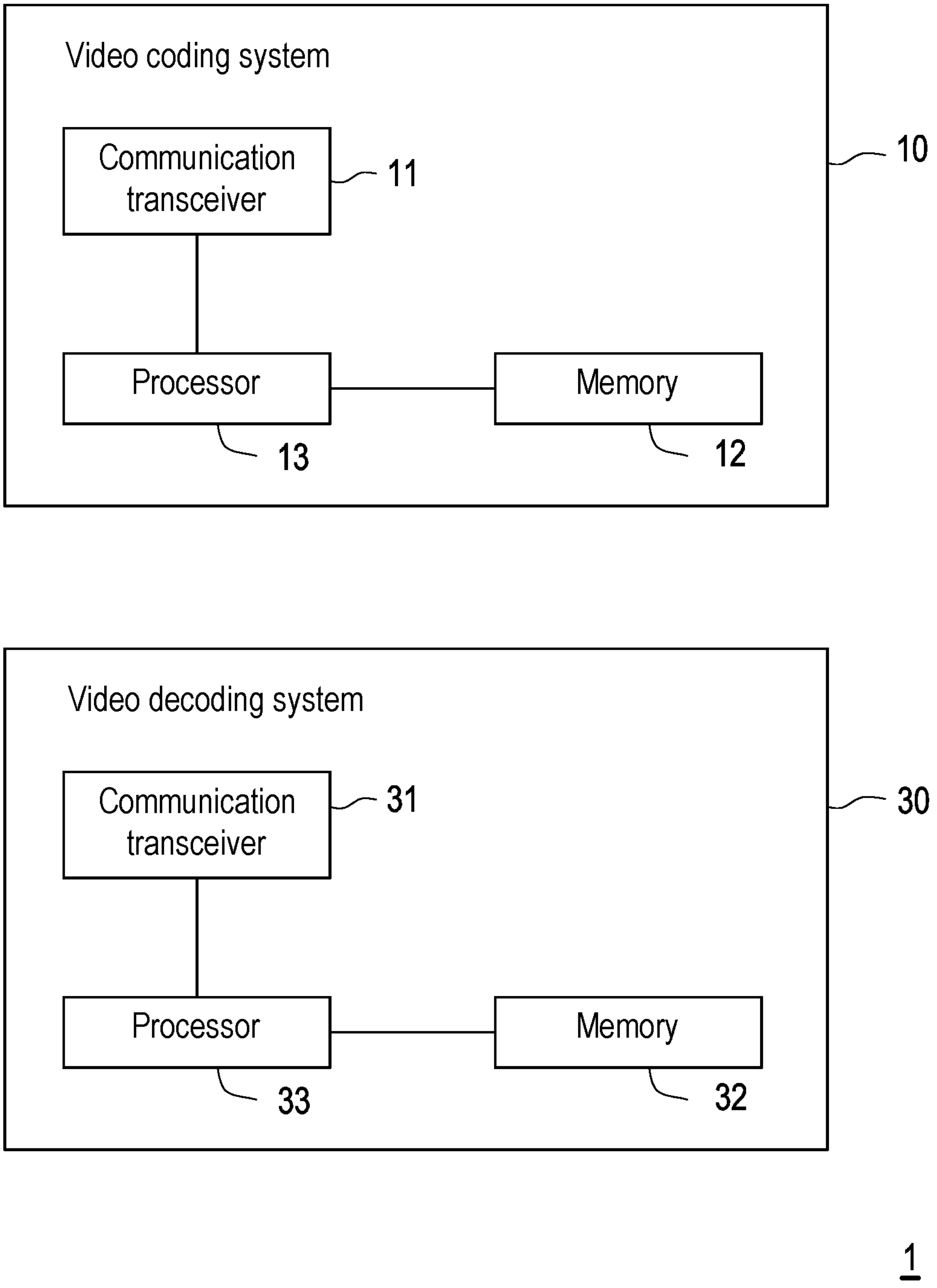
FIG. 1 is a block diagram of a video system according to an exemplary embodiment of the present disclosure.

FIG. 1 is a block diagram of a video system 1 according to an exemplary embodiment of the present disclosure. Referring to FIG. 1, the video system 1 includes a video encoding system 10 and a video decoding system 30.

The video encoding system 10 could be an image capture device, a smartphone, a tablet computer, a wearable device, a laptop, a server, other electronic devices, or a combination thereof. In one embodiment, the video encoding system 10 could be implemented by one or more of the above electronic devices.

The video encoding system 10 includes but is not limited to, one or more communication transceivers 11, one or more memories 12, and one or more processors 13.

The communication transceiver 11 could be the communication transceiving circuit supporting communication such as fifth generation (5G) or other generations of mobile communications, Wi-Fi, Bluetooth, infrared, radio frequency identification (Radio Frequency Identification, RFID), Ethernet, or optical fiber network, or could be serial communication interfaces (such as RS-232), Universal Serial Bus (USB), Thunderbolt or other communication transmission interfaces.

The memory 12 could be any type of fixed or removable random access memory (Random Access Memory, RAM), read-only memory (Read Only Memory, ROM), flash memory (flash memory), traditional hard disk drive (Hard Disk Drive, HDD), solid-state drive (Solid-State Drive, SSD) or similar components. In one embodiment, the memory 12 is used to store one or more program codes, software modules, configurations, data (such as images, bit streams, or algorithms) or files, and the embodiment will be described in detail later.

The processor 13 is coupled to the communication transceiver 11 and the memory 12. The processor 13 may be a central processing unit (CPU), a graphics processing unit (GPU), other programmable general-purpose or special-purpose microprocessor (Microprocessor), digital signal processing Digital Signal Processor (DSP), programmable controller, Field Programmable Gate Array (FPGA), Application-Specific Integrated Circuit (ASIC), neural network accelerator or other similar elements or combinations of the above elements. In one embodiment, the processor 13 is used to execute all or part of the operations of the video encoding system 10, and could load and execute each program code, software module, file, and data stored in the memory 12. In some embodiments, the functions of the processor 13 may be implemented by software or a chip.

The video decoding system 30 could be an image capture device, a smartphone, a laptop, a wearable device, a notebook computer, a server, other electronic devices, or a combination thereof. In one embodiment, the video decoding system 30 could be implemented by one or more of the above electronic devices.

The video decoding system 30 includes but is not limited to, one or more communication transceivers 31, one or more memories 32, and one or more processors 33.

The functions and implementations of the communication transceiver 31, the memory 32, and the processor 33 can be referred to the aforementioned descriptions of the communication transceiver 11, the memory 12, and the processor 13, respectively, and will not be described again here.

The processor 33 is coupled to the communication transceiver 31 and the memory 32. In one embodiment, the processor 33 is used to execute all or part of the operations of the video decoding system 30, and could load and execute each program code, software module, file, and data stored in the memory 32.

Figure 2A:
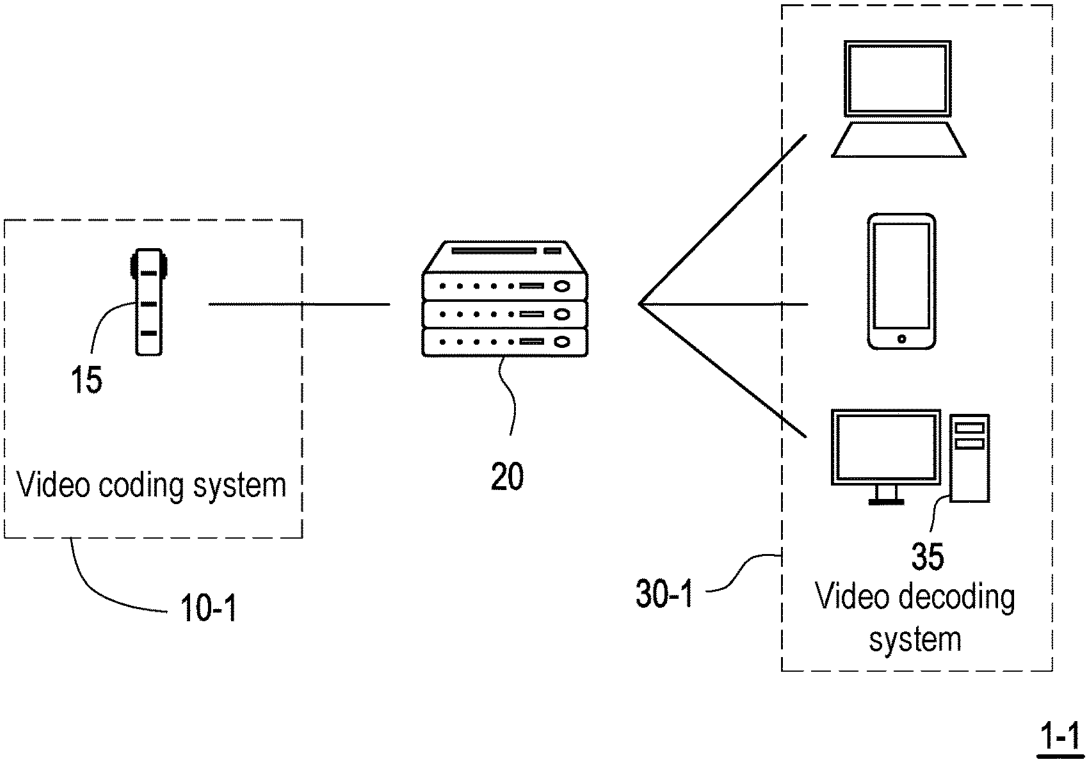
FIG. 2A is a schematic diagram of a video system according to the first embodiment of the present disclosure.

FIG. 2A is a schematic diagram of a video system 1-1 according to the first embodiment of the present disclosure. Referring to FIG. 2A, the video system 1-1 includes a video encoding system 10-1, a server 20, and a video decoding system 30-1. The video encoding system 10-1 includes an image capture device 15. The image capture device 15 may be a 360-degree camera, a 180-degree camera, or a device including multiple image sensors and lenses facing different viewing angles. In one embodiment, the image capture device 15 is used to capture panorama video, 360-degree video, or wide-angle video. Each video may include multiple consecutive images. For example, panoramic images, 360-degree images, or wide-angle images. The viewing angle corresponding to "wide angle" may be 120 degrees, 150 degrees, 180 degrees, or other degrees, and is not limited by the embodiment of the present invention.

The video decoding system 30-1 includes one or more terminal devices 35. The terminal device 35 may be a smartphone, a laptop, a wearable device, or other devices equipped with a display, e.g., LCD, LED display, or OLED display. In one embodiment, the terminal device 35 is used for playing images.

In one embodiment, the terminal device 35 detects the posture of the user's head through a motion sensor (such as an accelerometer, a gyroscope, a magnetic sensor, or an inertial sensing unit), or detects the gaze direction of eyes through an image sensor, so as to determine the user's viewing angle accordingly. For example, a specific angle, for example, 130 degrees, 145 degrees, or 150 degrees, is extended outward with the orientation of the head or the gaze direction of the eyes as the center. The terminal device 35 transmits the viewing angle to server 20. The server 20 may forward the viewing angle to video encoding system 10-1, e.g., image capture device 15. Furthermore, the video encoding system 10-1 and/or the server 20 may provide the corresponding video stream to the corresponding terminal device 35 according to the viewing angle.

Figure 2B:
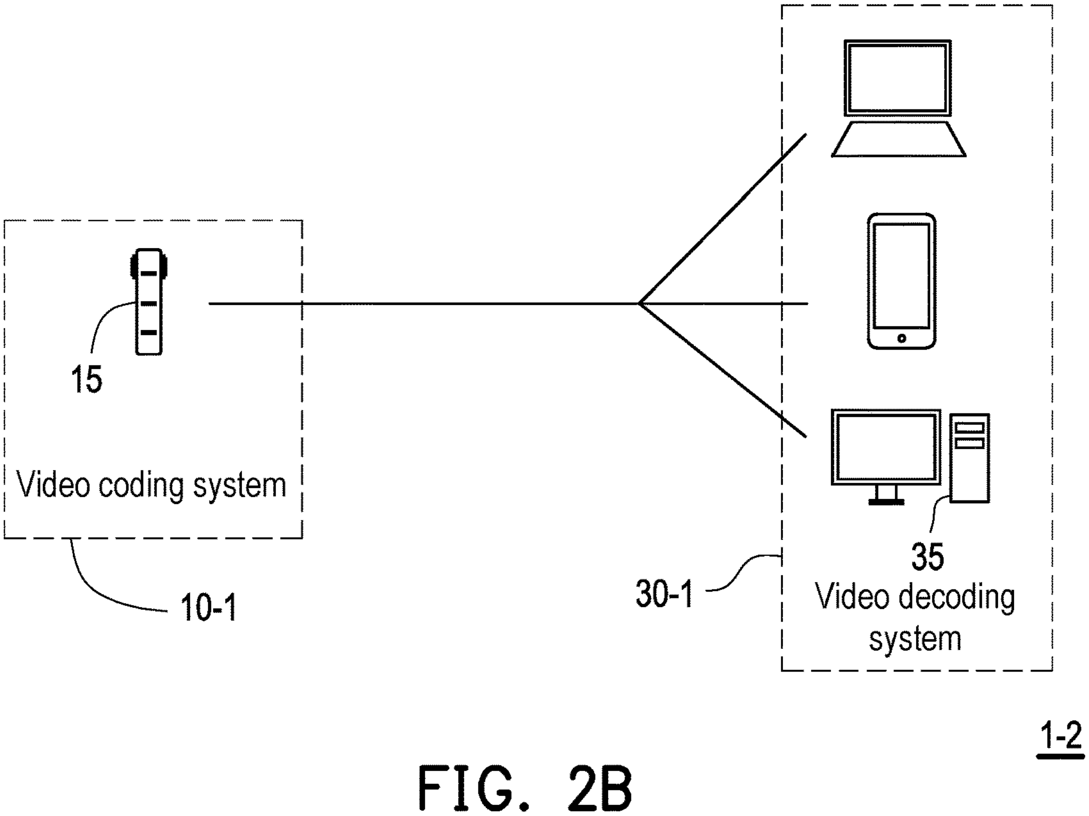
FIG. 2B is a schematic diagram of a video system according to the second embodiment of the present disclosure.

FIG. 2B is a schematic diagram of a video system 1-2 according to the second embodiment of the present disclosure. Referring to FIG. 2B, the difference from the first embodiment is that the video system 1-2 does not include the server 20. The terminal device 35 directly transmits the viewing angle to the video encoding system 10-1, for example, the image capture device 15. Furthermore, the video encoding system 10-1 may provide the corresponding video stream to the corresponding terminal device 35 according to the viewing angle.

Figure 2C:
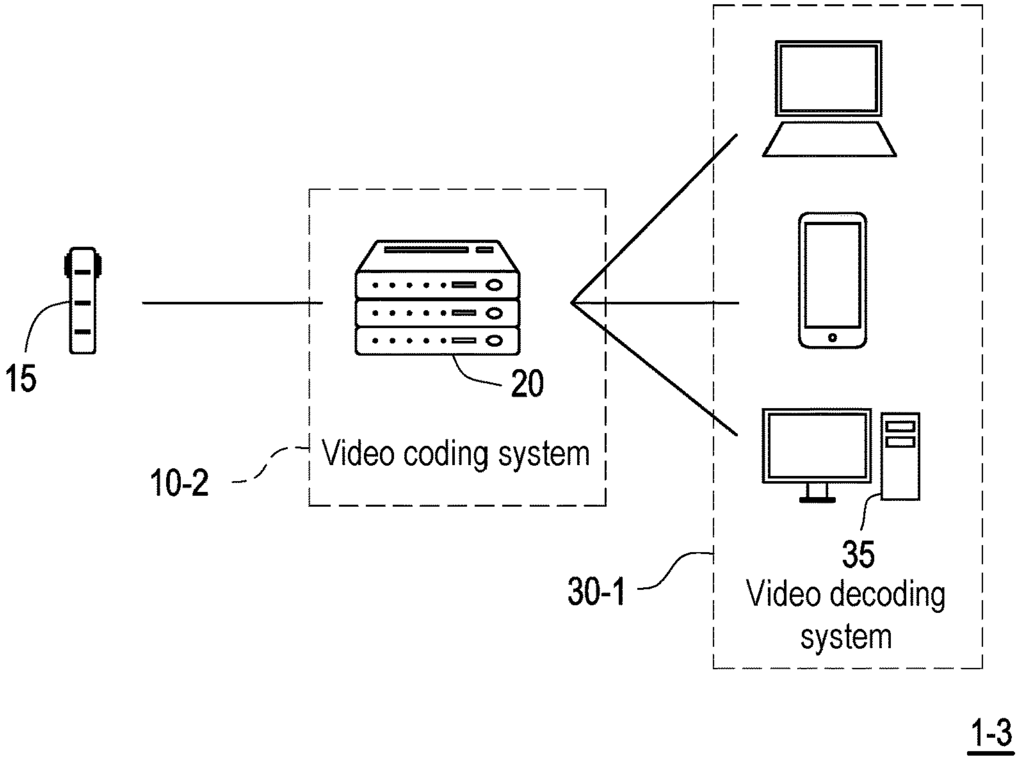
FIG. 2C is a schematic diagram of a video system according to the third embodiment of the present disclosure.

FIG. 2C is a schematic diagram of a video system 1-3 according to the third embodiment of the present disclosure. Referring to FIG. 2C, the difference from the first embodiment is that the video encoding system 10-2 of the video system 1-3 includes a server 20, but does not include the image capture device 15.

Figure 2D:
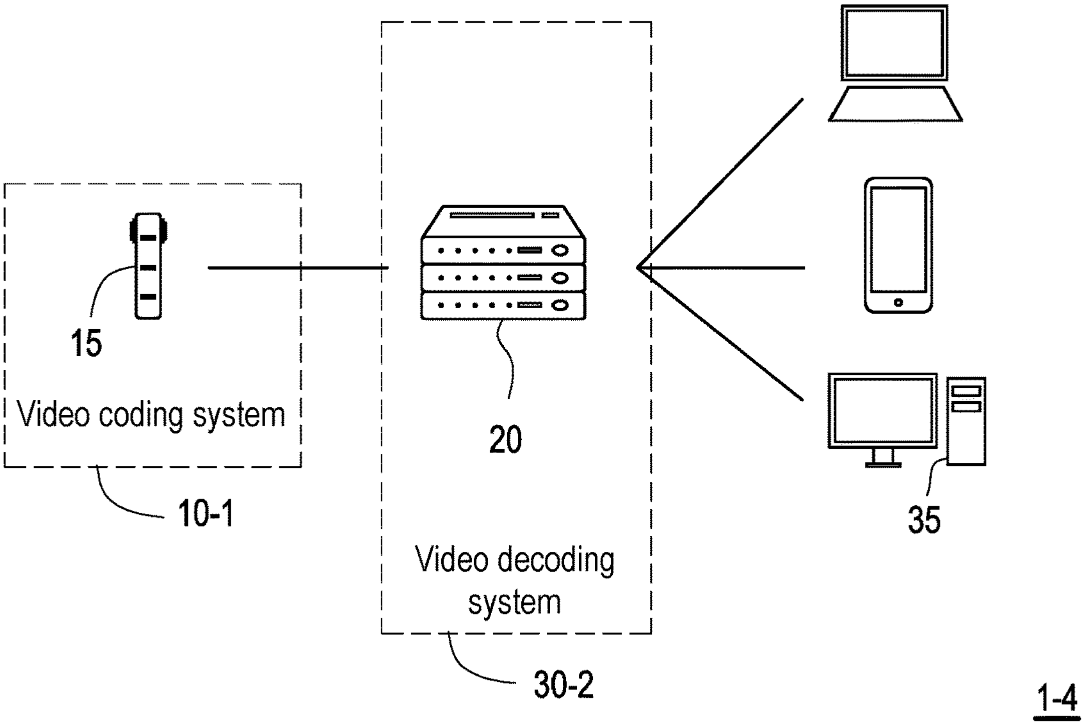
FIG. 2D is a schematic diagram of a video system according to the fourth embodiment of the present disclosure.

FIG. 2D is a schematic diagram of a video system 1-4 according to the fourth embodiment of the present disclosure. Referring to FIG. 2D, the difference from the first embodiment is that the video decoding system 30-2 of the video system 1-4 includes the server 20, but does not include the terminal device 35. Furthermore, the video decoding system 10-1 may provide corresponding images to the corresponding terminal device 35 according to the viewing angle.

In the following, the method described in the embodiment of the present disclosure would be described with reference to various devices, components, and modules in the video system 1, 1-1 to 1-4. Each process of this method can be adjusted according to the implementation situation.

Figure 3:
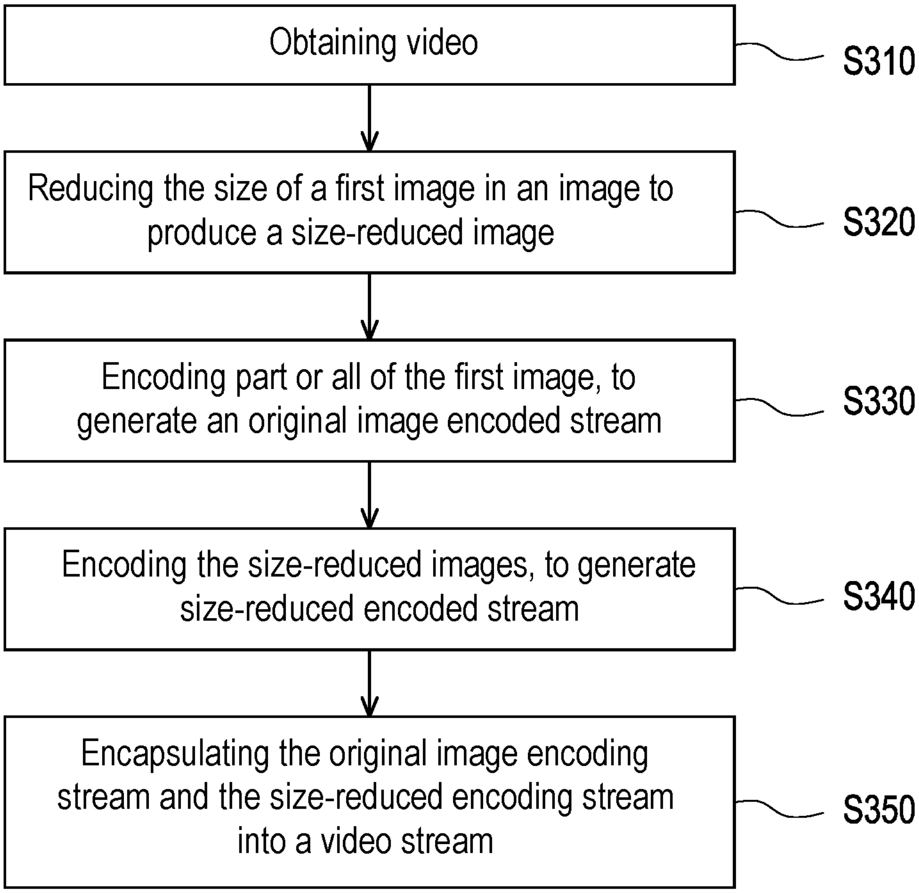
FIG. 3 is a flow chart of a video encoding method according to an exemplary embodiment of the present disclosure.

FIG. 3 is a flow chart of a video encoding method according to an exemplary embodiment of the present disclosure. Referring to FIG. 3, the processor 13 obtains the video (step S310). Specifically, the video includes multiple images. For example, the panoramic (Panorama) video, 360-degree video, or wide-angle video introduced above with respect to FIG. 2A. Each type of video may include multiple consecutive images/frames. For example, panoramic images, 360-degree images, or wide-angle images. In FIGS. 2A, 2B, and 2D, the processor 13 of the video encoding system 10-1 records video through an image capture module, e.g., a combination of a lens, an image sensor, and an image processor. In FIG. 2C, the processor 13 of the video encoding system 10-2 obtains the video from the image capture device 15 through the communication transceiver 11.

Referring to FIG. 3, the processor 13 reduces the size of the first image of multiple images, to generate a size-reduced image (step S320). Specifically, the first image is (any) one of multiple images/frames, where "first" is not used to limit their arrangement order. In one embodiment, the processor 13 may reduce the first image in a manner that maintains the aspect ratio of the first image to generate a size-reduced image. For example, the processor 13 reduces the first image in an equal proportion by dividing the pixels by two, three, or five, or from 3840 pixels×2160 pixels to 480 pixels×270 pixels. In another embodiment, the processor 13 may directly specify a value for changing the image size without necessarily continuing to maintain the aspect ratio of the first image. In one embodiment, the processor 13 may reduce the size by removing pixels or converting them into statistical values of multiple adjacent pixels.

Referring to FIG. 3, the processor 13 encodes part or all of the first image, to generate an original image encoded stream (step S330). Specifically, the part of the first image refers to the image of a partial region extracted from the complete first image, and the all of the first image refers to the complete or entire first image. Therefore, the size of the part of the first image is smaller than all of the first image.

In one embodiment, the processor 13 may cut the first image according to the viewing angle, to generate a part of the first image. The viewing angle, for example, corresponds to the head orientation or gaze direction of the eyes of the user of the terminal device 35 in FIGS. 2A to 2D and extend outwardly at a certain angle, e.g., 150, 175, or 180 degrees. The viewing angle could also be regarded as the angle range within which the user's eyes can receive images. The extended viewing angle corresponding to the part of the first image is larger than the viewing angle. The extended viewing angle is, for example, corresponding to the head orientation or gaze direction of the eyes of the user of the terminal device 35 in FIGS. 2A to 2D and extending to an angle larger than the viewing angle.

Figure 4:
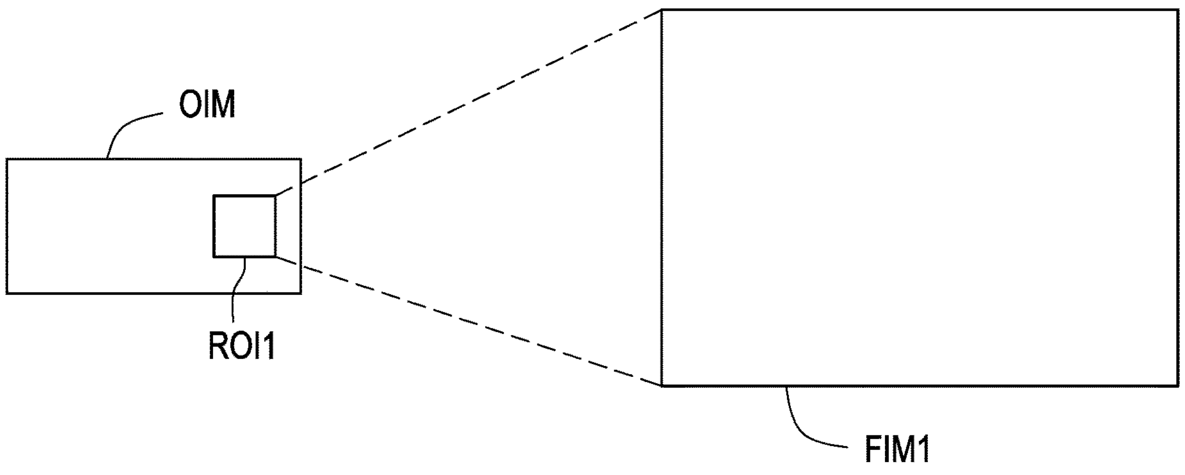
FIG. 4 is a schematic diagram of an image with the range corresponding to a viewing angle according to an exemplary embodiment of the present disclosure.

For example, FIG. 4 is a schematic diagram of an image FIM1 with the range ROI1 corresponding to a viewing angle according to an exemplary embodiment of the present disclosure. Referring to FIG. 4, since the first image OIM1 is a panorama image, a 360-degree image, or a wide-angle image, the viewing angle corresponding range ROI1 (or field of view) only occupies part of the image area of the first image OIM1. The processor 13 may determine the image area (located with pixel coordinates) of the corresponding range ROI1 in the first image OIM1 according to the viewing angle, and cut the image area to generate the image FIM1.

In one embodiment, the range corresponding to the extended viewing angle is extended from one or more sides of the range corresponding to the viewing angle. For example, it extends outward from the left and right sides of the range corresponding to the viewing angle, or extends outward from the upper, lower, left, and right sides of the range corresponding to the viewing angle.

Figure 5:
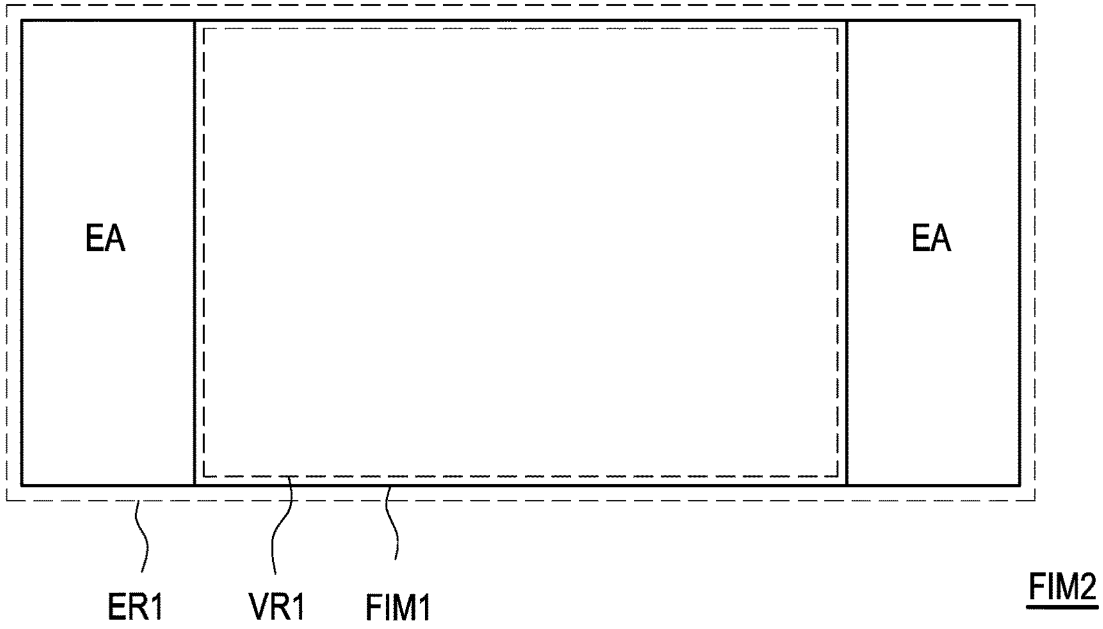
FIG. 5 is a schematic diagram of ranges corresponding to a viewing angle and an extended viewing angle according to an exemplary embodiment of the present disclosure.

For example, FIG. 5 is a schematic diagram of ranges VR1 and ER1 corresponding to a viewing angle and an extended viewing angle according to an exemplary embodiment of the present disclosure. Referring to FIG. 5, the processor 13 may extend the left and right sides of the range VR1 corresponding to the viewing angle outward. Compared with the range VR1 corresponding to the viewing angle, the range ER1 corresponding to the extended viewing angle also includes extended areas EA located on the left and right sides of the range VR1. The processor 13 may cut the corresponding image area from the first image OIM1 in FIG. 4 according to the extended area EA as a part of the first image OIM1. The processor 13 may use the range ER1 corresponding to the extended viewing angle as the part FIM2 of the first image.

It should be noticed that the size of the extension area EA could be determined according to actual needs, and is not limited in the embodiment of the present disclosure. Furthermore, the processor 13 may also directly determine the size of the range ER1 corresponding to the extended viewing angle, and cut the corresponding image area from the first image OIM1 without first cutting the image FIM1.

In one embodiment, the encoding technology may be quad-tree (QT), extended quad-tree (Extended Quad-Tree, EQT), or other data structure video encoding. For example, high-efficiency video coding (HEVC) or audio video coding standard (AVS). However, depending on different application requirements, the encoding technology may also be moving picture experts group (MPEG), ProRes, versatile video coding (VVC), or other technologies, and the embodiments of the present disclosure are not limited thereto. Thereby, a coded bit stream corresponding to all or part of the first image could be obtained.

Referring to FIG. 3, the processor 13 encodes the size-reduced image, to generate a size-reduced encoded stream (step S340). Specifically, the introduction of encoding technology may refer to the above description, and will not be described again here. Therefore, the processor 13 can generate encoded bit streams corresponding to all or part of the first image and the size-reduced image respectively. Depending on different design requirements, the size-reduced image encoded stream may be smaller than the original image encoded stream, but is not limited to thereto.

Referring to FIG. 3, the processor 13 encapsulates the original image encoded stream and the size-reduced image encoded stream into a video stream (step S350). Specifically, the video stream may include both an original image encoded stream and a size-reduced image encoded stream. For example, the original image encoded stream and the size-reduced image encoded stream are encapsulated in the same network packet. For another example, an association is established between the original image encoded stream and the size-reduced image encoded stream corresponding to the first image of the same frame, and could be split into multiple network packets as required.

Figure 6:
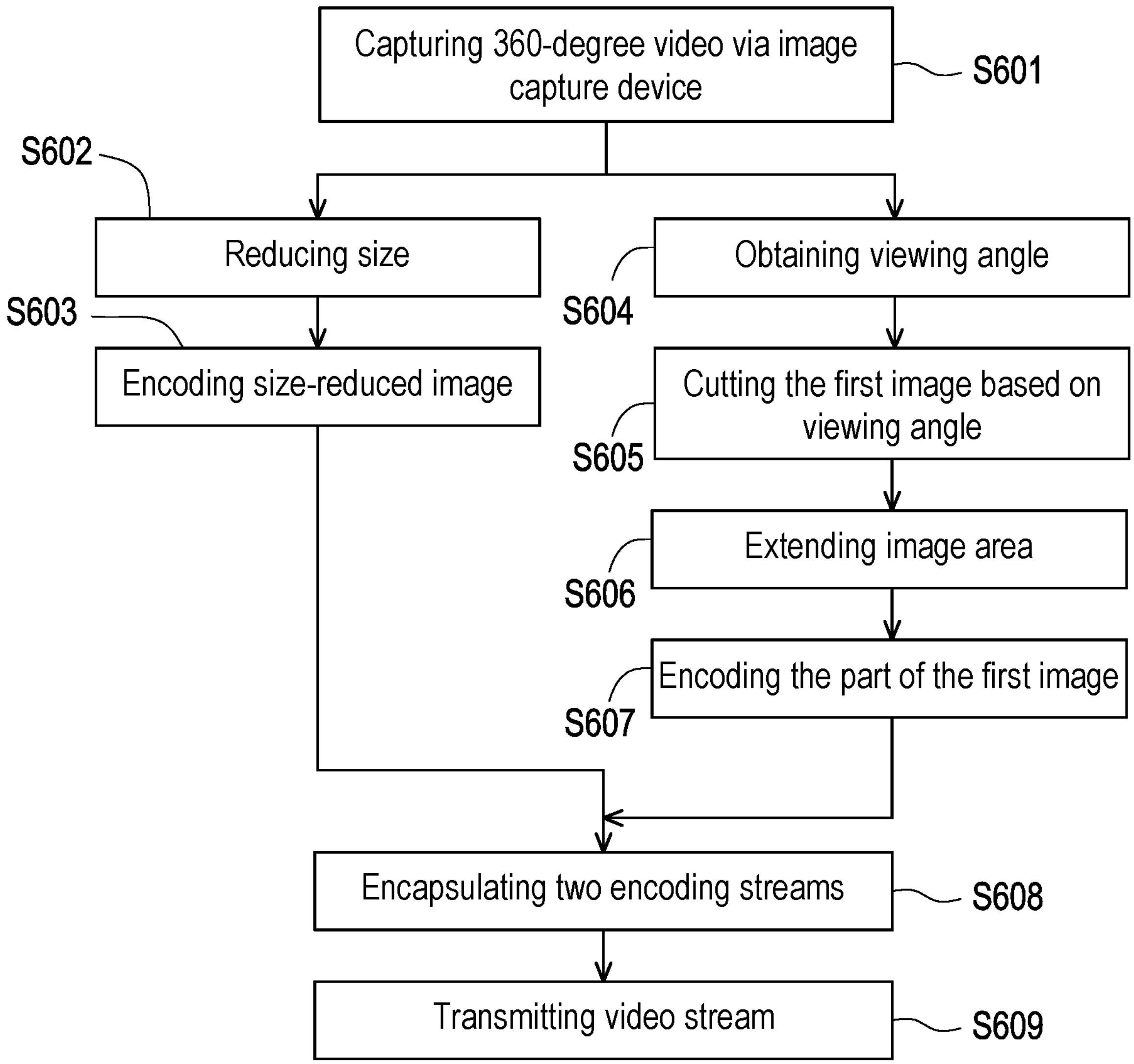
FIG. 6 is a flow chart of a video encoding method according to an exemplary embodiment of the present disclosure.
Figure 7A:
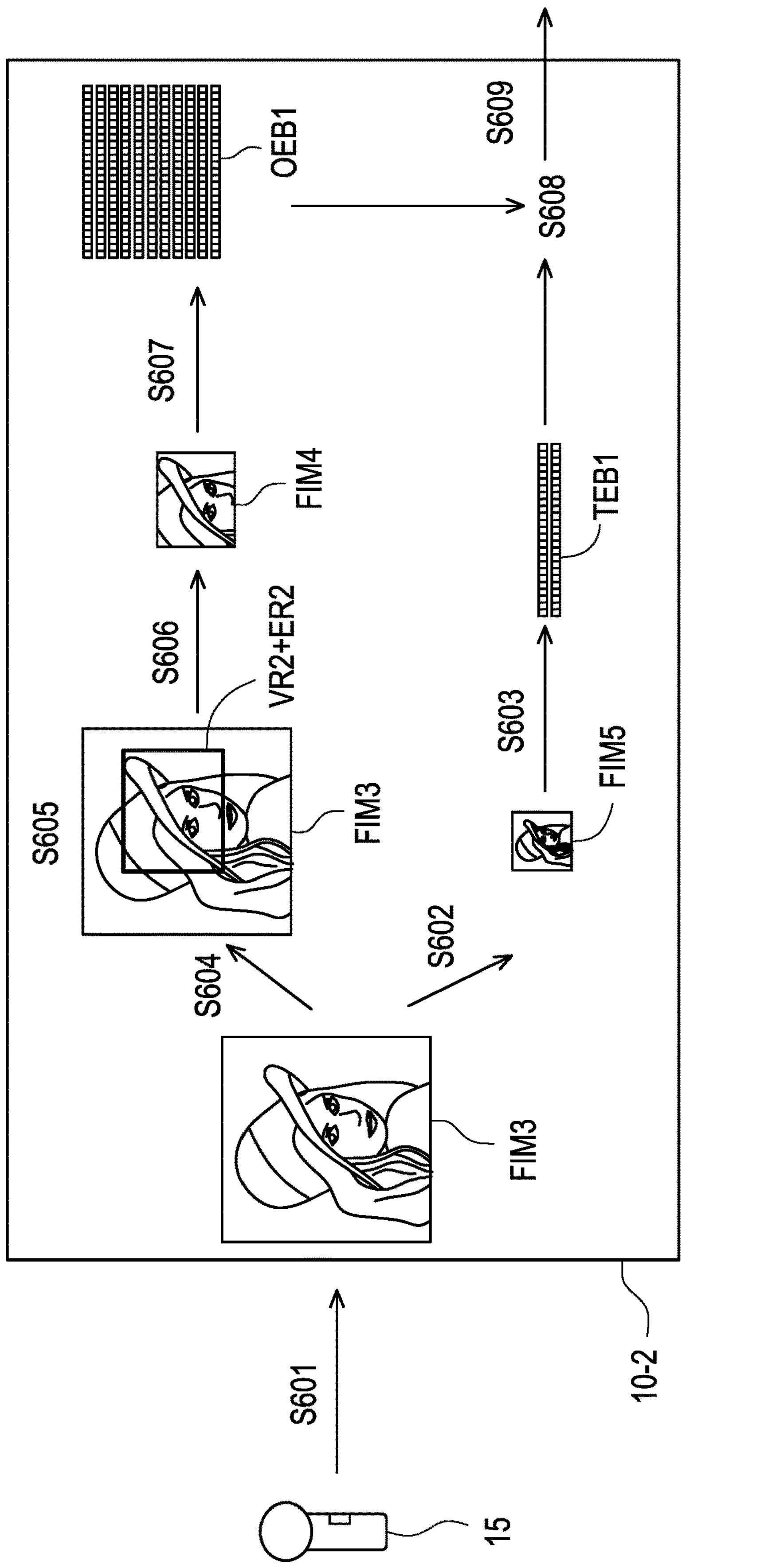
FIG. 7A is a schematic diagram of a video encoding procedure according to an exemplary embodiment of the present disclosure.

FIG. 6 is a flow chart of a video encoding method according to an exemplary embodiment of the present disclosure, and FIG. 7A is a schematic diagram of a video encoding procedure according to an exemplary embodiment of the present disclosure. Referring to FIGS. 6 and 7, in an application scenario, the processor 13 of the video encoding system 10-2 (for example, implemented by the server 20 of FIG. 2C) captures the 360-degree video through the image capture device 15 of FIGS. 2A to 2D and 7A (step S601), reduce the first image FIM3 of one image/frame in the 360-degree video (step S602, and generate the size-reduced image FIM5), and encode the size-reduced image FIM5 (step S603, and generate the size-reduced image encoded stream TEB1). On the other hand, the processor 13 obtains the viewing angle of the terminal device 35 in FIGS. 2A to 2D (step S604), cuts the first image FIM3 according to the viewing angle (step S605), and extends the range VR2 corresponding to the viewing angle (step S606), to generate the part FIM4 of the first image. Part FIM4 of the first image corresponds to the range of extended viewing angles ER2 (covering the range of viewing angles VR2). Furthermore, the processor 13 encodes part FIM4 of the first image (step S607, and generates the original image encoded stream OEB1), fuses the size-reduced encoded stream TEB1 and the original image encoded stream OEB1 (step S608, and generates a video stream), and transmit the video stream through the communication transceiver 11 (step S609).

Figure 7B:
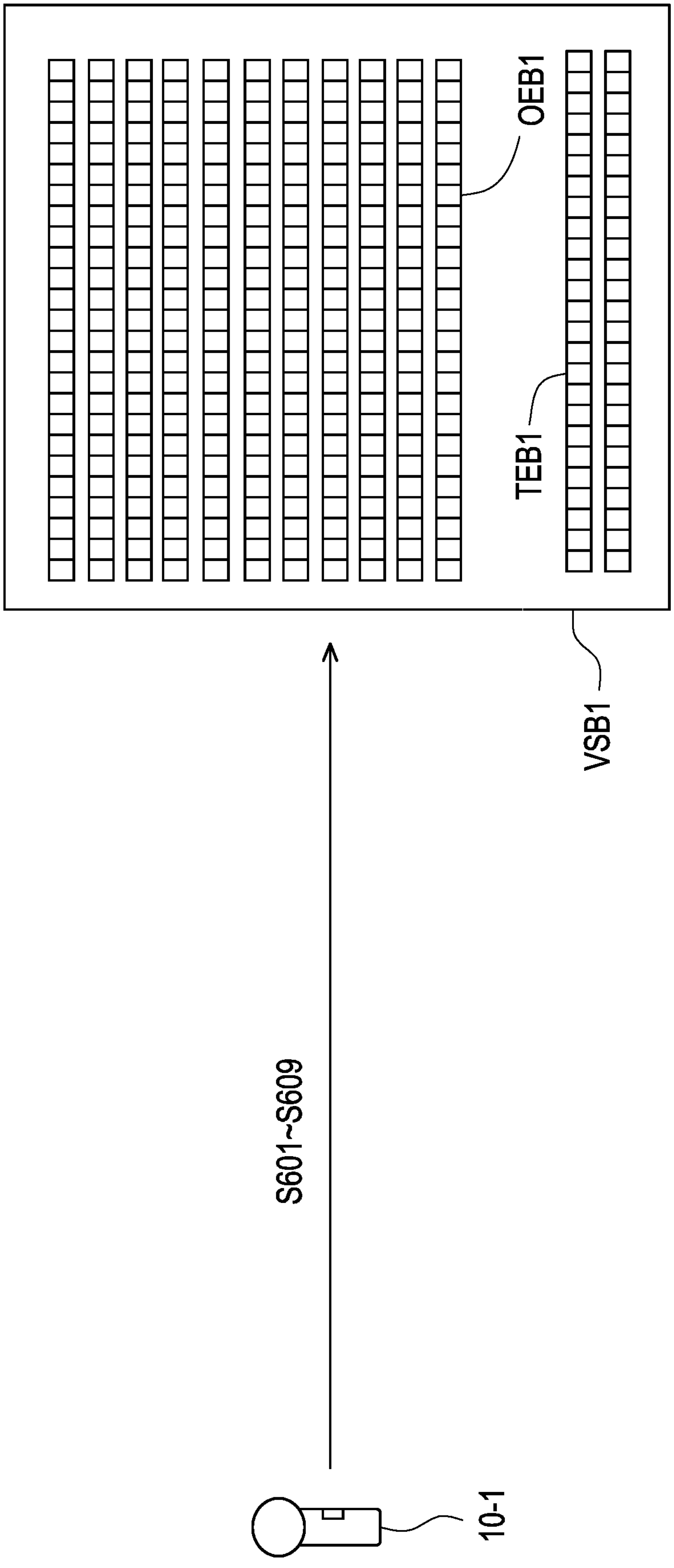
FIG. 7B is a schematic diagram of a video encoding process according to another exemplary embodiment of the present disclosure.

FIG. 7B is a schematic diagram of a video encoding process according to another exemplary embodiment of the present disclosure. Referring to FIG. 7B, the difference from the embodiment of FIG. 7A is that steps S601 to S609 are executed by the processor 13 of the video encoding system 10-1 (for example, implemented by the image capture device 15 of FIG. 2A, 2B, or 2D). Furthermore, the video encoding system 10-1 transmits the video stream VSB1 (including both the size-reduced encoded stream TEB1 and the original image encoded stream OEB1) to the server 20 (step S609).

Figure 8:
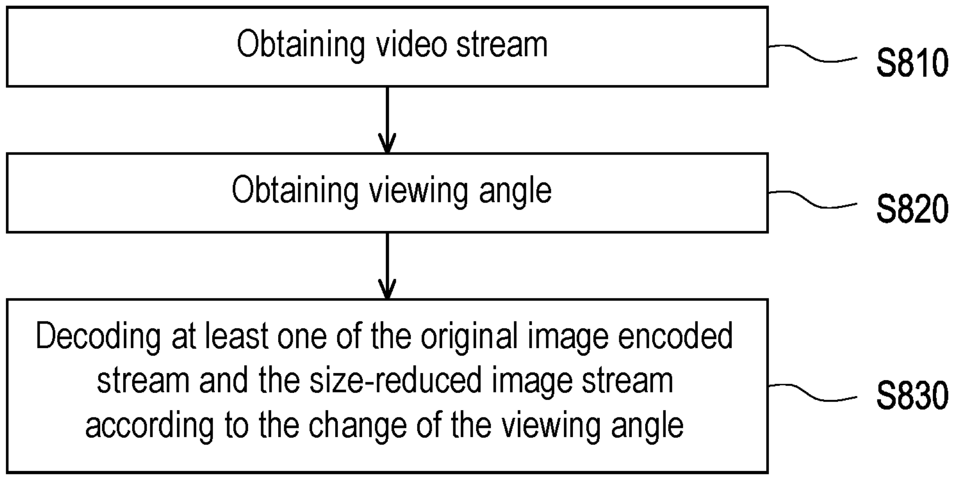
FIG. 8 is a flow chart of a video decoding method according to an exemplary embodiment of the present disclosure.

FIG. 8 is a flow chart of a video decoding method according to an exemplary embodiment of the present disclosure. Referring to FIG. 8, the processor 33 obtains the video stream through the communication transceiver 31 (step S810). Specifically, the video stream includes the original image encoded stream and the size-reduced image encoded stream. The original image encoded stream is generated by encoding part or all of the first image, the size-reduced image encoded stream is generated by encoding the size-reduced image, and the size-reduced image is generated by reducing the size of the first image. For example, the video stream, original image encoded stream, size-reduced image encoded stream, first image, and size-reduced image introduced in FIGS. 3 to 7B, and their introductions will not be described again here.

Referring to FIG. 8, the processor 33 obtains the viewing angle (step S820). Specifically, reference may be made to the description of FIGS. 3 to 7B for the viewing angle, which will not be described again here. The processor 33 may receive the viewing angle fed back by the terminal device 35 as shown in FIG. 2A to FIG. 2D through the communication transceiver 31.

In one embodiment, in response to the original image encoded stream corresponding to the all of first image, the processor 33 may cut the all of first image according to the viewing angle as the part of the first image. As described above in FIGS. 3 to 7B, the extended viewing angle corresponding to the part of the first image is larger than the viewing angle.

Referring to FIG. 8, the processor 33 decodes at least one of the original image encoded stream and the size-reduced image encoded stream according to the change of viewing angle (step S830). Specifically, the processor 33 monitors the viewing angle in real time and determines whether the viewing angle changes. For example, the head of the user of the terminal device 35 of FIGS. 2A to 2D is rotated or the eyes are moved. Changes in the posture of the head or the position of the eyes correspond to the change of viewing angle. The processor 33 may decide to decode the original image encoded stream and/or the size-reduced image encoded stream according to the amount of the change. It should be noted that the decoding technology is based on the encoding technology introduced in step S330, and will not be described again here.

Figure 9:
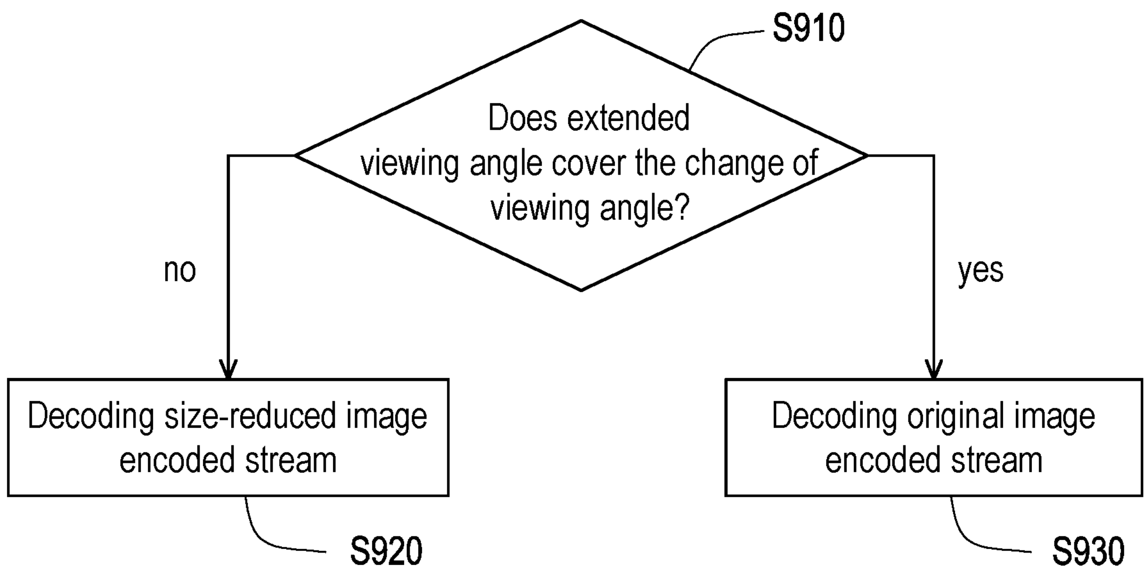
FIG. 9 is a flow chart illustrating a decoding decision according to an exemplary embodiment of the present disclosure.

FIG. 9 is a flow chart illustrating a decoding decision according to an exemplary embodiment of the present disclosure. Referring to FIG. 9, the processor 33 may determine whether the extended viewing angle covers the change of viewing angle (step S910). The extended viewing angle extends outward from the viewing angle and covers the viewing angle. The processor 33 may determine whether the extended viewing angle still covers the changed viewing angle. For example, does the extended viewing angle overlap with the changed viewing angle?

In response to the extended viewing angle not covering the change of viewing angle, the processor 33 may decode the size-reduced image encoded stream to generate a size-reduced image (step S920). The extended viewing angle corresponds to a part of the first image, and the extended viewing angle is larger than or covers the viewing angle. As shown in FIG. 5, compared with the range VR1 corresponding to the (original) viewing angle, the range ER1 corresponding to the extended viewing angle also includes an extended area EA. If the range corresponding to the changed viewing angle completely exceeds the range ER1 corresponding to the extended viewing angle (that is, the changed viewing angle does not overlap with the extended viewing angle), then the part of the first image corresponding to the original image encoded stream is no longer suitable for the changed viewing angle. Since the size-reduced image corresponds to the all of first image, the angle of view corresponding to the size-reduced image may still cover the changed viewing angles.

On the other hand, in response to the extended view angle covering the change of the viewing angle, the processor 33 may decode the original image encoded stream to generate a part of the first image (step S930). Taking FIG. 5 as an example, if the range corresponding to the changed viewing angle does not completely exceed the range ER1 corresponding to the extended angle of view (that is, the changed viewing angle partially or completely overlaps the extended angle of view), then the part of the first image corresponding to the original image encoded stream still suitable for the changed viewing angles.

In one embodiment, the processor 33 may further decode the size-reduced image encoded stream to generate a size-reduced image in response to the extended view angle only partially covering the change of viewing angle. That is to say, although the range corresponding to the changed viewing angle exceeds the range corresponding to the extended viewing angle, a part of the changed viewing angle overlaps with the extended viewing angle, and another part of the changed viewing angle does not overlap with the extended viewing angle. At this time, it is still necessary to use the size-reduced image to compensate for the area beyond the range corresponding to the extended viewing angle.

Figure 10:
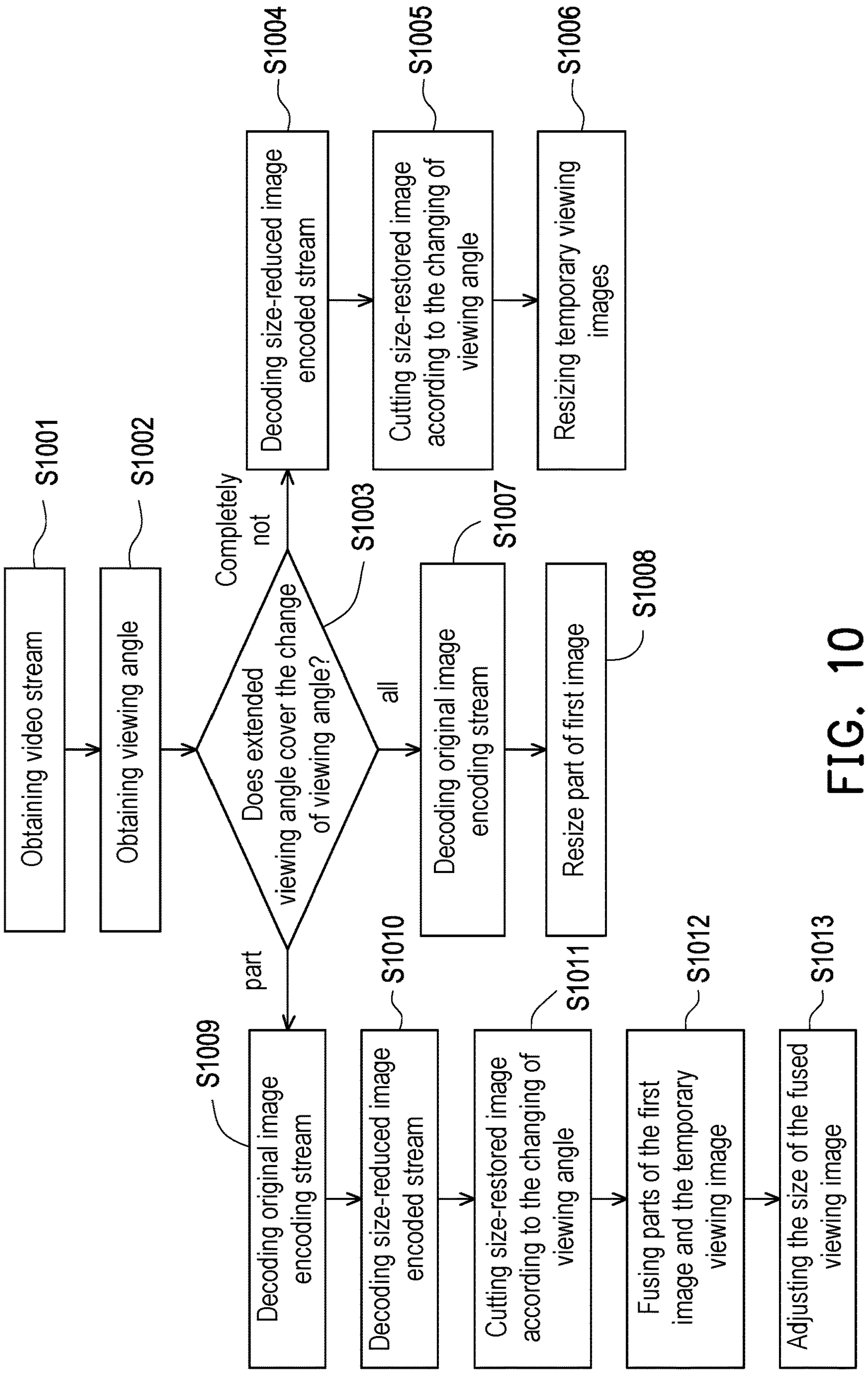
FIG. 10 is a flow chart of a video decoding method according to an exemplary embodiment of the present disclosure.
Figure 11:
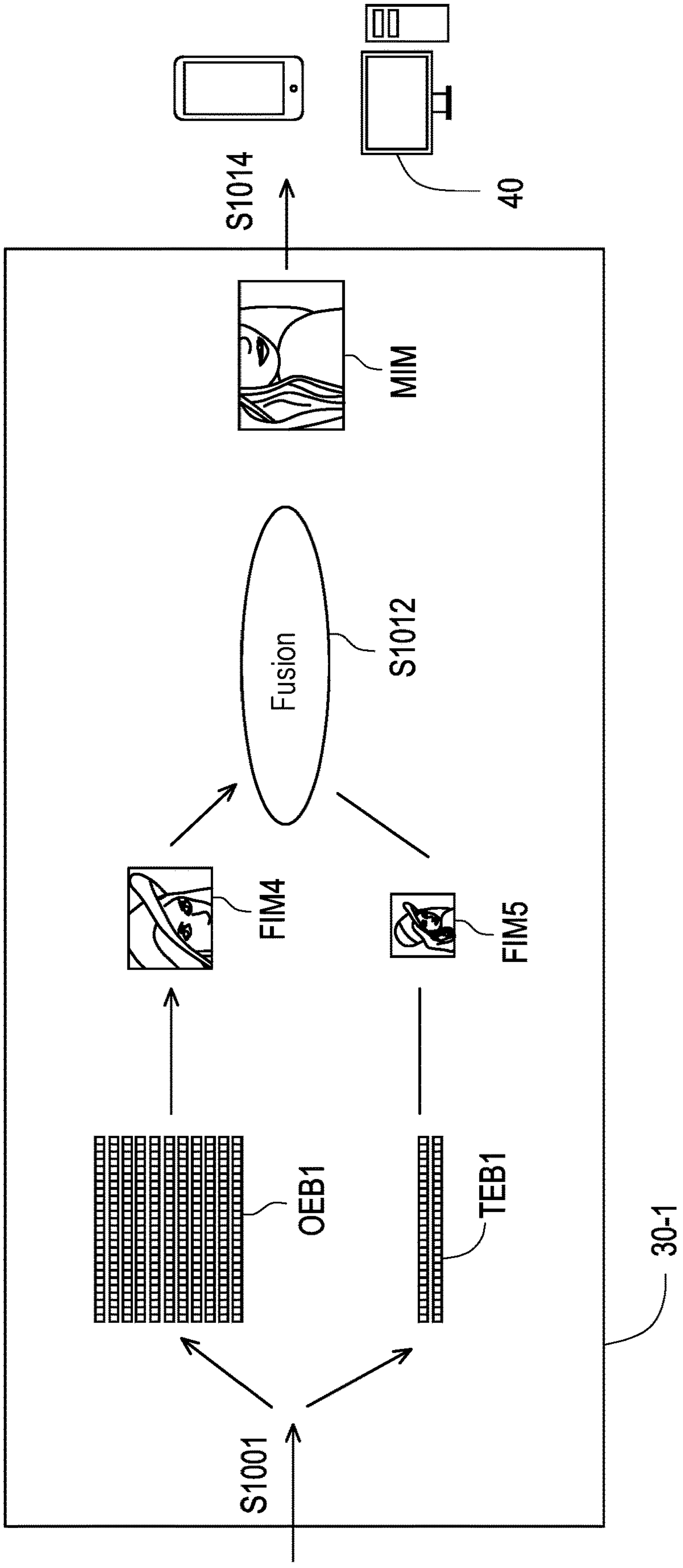
FIG. 11 is a schematic diagram of a video decoding process according to another exemplary embodiment of the present disclosure.

FIG. 10 is a flow chart of a video decoding method according to an exemplary embodiment of the present disclosure, and FIG. 11 is a schematic diagram of a video decoding process according to another exemplary embodiment of the present disclosure. Referring to FIG. 10 and FIG. 11, the processor 33 obtains the video stream through the communication transceiver 31 (step S1001), and obtains the viewing angle (step S1002). The processor 33 tracks the viewing angle and determines whether the extended angle covers the change of the viewing angle (step S1003). In response to the extended viewing angle not covering the change of the viewing angle at all, the processor 33 may only decode the size-reduced image encoded stream TEB1 (step S1004) to generate the size-reduced image FIM5.

Furthermore, the processor 33 enlarges the size-reduced image FIM5 as the size of (the entire) first image, to generate a size-restored image. For example, the processor 13 enlarges the reduced image from 480 pixels×270 pixels to 3840 pixels×2160 pixels. In one embodiment, the processor 13 may enlarge the size through interpolation or super-sampling.

Then, the processor 33 may cut and restore the image according to the changed viewing angle (step S1005), to generate a temporary viewing image. The processor 13 may determine the image area (located based on pixel coordinates) of the size-restored image corresponding to the changed viewing angle, and cut the image area to generate a temporary viewing image.

In some embodiments, the processor 33 may adjust the size of the temporary viewing image according to the supported specifications (e.g., resolution) of the display of the terminal device 35 as shown in FIGS. 2A to 2D (step S1006) to comply with the supported specifications of the display. The display may play the temporary viewing image, and the temporary viewing image corresponds to the current viewing angle (i.e., the changed viewing angle).

On the other hand, the processor 33 may also report the changed viewing angle to the video encoding systems 10, 10-1~10-4 through the communication transceiver 31, so that the video encoding systems 10, 10-1~10-4 may generate a corresponding new original image encoded stream based on the changed viewing angle. In some application scenarios (for example, the user's position does not move), the video encoding system 10, 10-1~10-4 may only transmit the size-reduced image encoded stream once to save bandwidth usage.

In response to the extended viewing angle completely covering the change of viewing angle, the processor 33 may only decode the original image encoded stream OEB1 (step S1007), to generate the part FIM4 of the first image (corresponding to the extended viewing angle).

In some embodiments, the processor 33 may adjust the size of the part FIM4 (corresponding to the extended viewing angle) of the first image (step S1008), to comply with the monitor's support specifications. The display may play the part FIM4 of the first image (corresponding to the extended viewing angle), and the part FIM4 of the first image corresponds to the current viewing angle (i.e., the changed viewing angle).

On the other hand, the processor 33 may also report the changed viewing angle to the video encoding systems 10, 10-1~10-4 through the communication transceiver 31, so that the video encoding systems 10, 10-1~10-4 may generate a corresponding new original image encoded stream based on the changed viewing angle.

In response to the extended viewing angle only partially covering the change of viewing angle, the processor 33 may decode the original image encoded stream OEB1 (step S1009, and generate the part FIM4 of the first image), and decode the size-reduced image encoded stream TEB1 (step S1010, and generate a size-reduced image FIM5). Similarly, the processor 33 may enlarge the size-reduced image FIM5 as the size of the first image, to generate a size-restored image, and cut the size-restored image according to the change of viewing angle (step S1011), to generate a temporary viewing image (please refer to Step S1005 will not be described again here).

Furthermore, in response to the extended viewing angle only partially covering the change of viewing angle, the processor 33 fuses the part of the first image (corresponding to the extended viewing angle) and the temporary viewing image to generate a fused viewing image MIM (step S1012). For example, the processor 33 may compare the range of the part of the first image with the range of the temporary viewing image at their pixel coordinates in the first image. For the area where the part of the first image overlaps with the temporary viewing image, the processor 33 retains the part of the first image (corresponding to the extended viewing angle) and abandons/deletes/ignores the part of the temporary viewing image; for the area where the part of the first image and the temporary viewing image do not overlap, the processor 33 retains the part of the temporary viewing image and discards/delete/ignore the part of the first image (corresponding to the extended viewing angle). Then, the processor 33 may fuse all the retained parts of these image areas according to their pixel coordinates, to generate a fused viewing image.

In some embodiments, the processor 33 may adjust the size of the fused viewing image (step S1013) according to the supported specifications (for example, resolution) of the display 40 of the terminal device 35 as shown in FIGS. 2A to 2D, to comply with the supported specifications of the display. The display 40 may play the fused viewing image (step S1014), and the fused viewing image corresponds to the current viewing angle (i.e., the changed viewing angle).

On the other hand, the processor 33 may also report the changed viewing angle to the video encoding systems 10, 10-1~10-4 through the communication transceiver 31, so that the video encoding systems 10, 10-1~10-4 may generate a corresponding new original image encoded stream based on the changed viewing angle. Before obtaining the new original image encoded stream, the display 40 may still play the image corresponding to the changed viewing angle.

In summary, in the video encoding method and system and the video decoding method and system of the embodiments of the present invention, the encoding end provides an image area with an extended viewing angle that is larger than the viewing angle and an encoded stream corresponding to the size-reduced image, and decoding end provides the appropriate encoded stream based on the change of viewing angle. It could meet the needs of changing viewing angles, enable uninterrupted viewing of content and save bandwidth usage, thereby improving the viewing experience and immersion.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A video encoding method, comprising:
- obtaining a video, wherein the video comprises a plurality of images;
- reducing a size of a first image of the plurality of images, to generate a size-reduced image;
- cutting the first image according to a viewing angle, to generate a part of the first image, wherein an extended viewing angle corresponding to the part of the first image is larger than the viewing angle;
- encoding the part or all of the first image into an encoded bit stream through a video coding, to generate an original image encoded stream;
- encoding the size-reduced image into another encoded bit stream through the video coding, to generate a size-reduced image encoded stream; and
- encapsulating the original image encoded stream and the size-reduced image encoded stream into a video stream, wherein the original image encoded stream and the size-reduced image encoded stream are encapsulated in a same network packet.

2. The video encoding method according to claim 1, wherein a range corresponding to the extended viewing angle is extended from at least one side of a range corresponding to the viewing angle.

3. The video encoding method according to claim 1, wherein each of the plurality of the image is a panorama image, a 360-degree image, or a wide-angle image.

4. A video decoding method, comprising:
- obtaining a video stream, wherein the video stream comprises an original image encoded stream and a size-reduced image encoded stream, the original image encoded stream is generated by encoding a part or all of a first image, the size-reduced image encoded stream is generated by encoding a size-reduced image, and the size-reduced image is generated by reducing a size of the first image;
- obtaining a viewing angle; and
- decoding at least one of the original image encoded stream and the size-reduced image encoded stream according to a change of the viewing angle,
- wherein decoding the at least one of the original image encoded stream and the size-reduced image encoded stream according to the change of the viewing angle comprises:
- in response to an extended viewing angle not covering the change of the viewing angle, decoding the size-reduced image encoded stream, to generate the size-reduced image, wherein the extended viewing angle corresponds to the part of the first image, and the extended viewing angle is larger than the viewing angle; and
- in response to the extended viewing angle covering the change of the viewing angle, decoding the original image encoded stream, to generate the part of the first image.

5. The video decoding method according to claim 4, further comprising:
- in response to the extended viewing angle partially covering the change of the viewing angle, further decoding the size-reduced image encoded stream, to generate the size-reduced image.

6. The video decoding method according to claim 4, wherein after decoding the size-reduced image encoded stream, the video decoding method further comprises:
- enlarging the size-reduced image as a size of the first image, to generate a size-restored image; and
- cutting the size-restored image according to the change of the viewing angle, to generate a temporary viewing image.

7. The video decoding method according to claim 6, wherein after generating the temporary viewing image, the video decoding method further comprises:
- in response to the extended viewing angle partially covering the change of the viewing angle, fusing the part of the first image and the temporary viewing image, to generate a fused viewing image.

8. The video decoding method according to claim 4, further comprising:
- cutting the all of the first image according to the viewing angle, to generate the part of the first image, wherein wherein the extended viewing angle corresponding to the part of the first image is larger than the viewing angle.

9. A video encoding system, comprising:
- at least one memory, used for storing at least one program code; and
- at least one processor, coupled to the at least one memory, configured to execute the at least one program code and perform:
- obtaining a video, wherein the video comprises a plurality of images;
- reducing a size of a first image of the plurality of images, to generate a size-reduced image;
- cutting the first image according to a viewing angle, to generate a part of the first image, wherein an extended viewing angle corresponding to the part of the first image is larger than the viewing angle;
- encoding the part or all of the first image into an encoded bit stream through a video coding, to generate an original image encoded stream;
- encoding the size-reduced image into another encoded bit stream through the video coding, to generate a size-reduced image encoded stream; and
- encapsulating the original image encoded stream and the size-reduced image encoded stream into a video stream, wherein the original image encoded stream and the size-reduced image encoded stream are encapsulated in a same network packet.

10. The video encoding system according to claim 9, wherein a range corresponding to the extended viewing angle is extended from at least one side of a range corresponding to the viewing angle.

11. The video encoding system according to claim 9, wherein each of the plurality of the image is a panorama image, a 360-degree image, or a wide-angle image.

12. The video encoding system according to claim 9, further comprising:
- at least one image capturing device, coupled to the at least one processor, and used for recording the video.

13. A video decoding system, comprising:

a communication transceiver, used for receiving or transmitting data;

at least one memory, used for storing at least one program code; and at least one processor, coupled to the communication transceiver and the at least one memory, configured to execute the at least one program code and perform:

obtaining, through the communication transceiver, a video stream, wherein the video stream comprises an original image encoded stream and a size-reduced image encoded stream, the original image encoded stream is generated by encoding a part or all of a first image, the size-reduced image encoded stream is generated by encoding a size-reduced image, and the size-reduced image is generated by reducing a size of the first image;

obtaining a viewing angle; and decoding at least one of the original image encoded stream and the size-reduced image encoded stream according to a change of the viewing angle, wherein the at least one processor is further configured for:

in response to an extended viewing angle not covering the change of the viewing angle, decoding the size-reduced image encoded stream, to generate the size-reduced image, wherein the extended viewing angle corresponds to the part of the first image, and the extended viewing angle is larger than the viewing angle; and in response to the extended viewing angle covering the change of the viewing angle, decoding the original image encoded stream, to generate the part of the first image.

14. The video decoding system according to claim 13, wherein the at least one processor is further configured for:

in response to the extended viewing angle partially covering the change of the viewing angle, further decoding the size-reduced image encoded stream, to generate the size-reduced image.

15. The video decoding system according to claim 13, wherein the at least one processor is further configured for:

enlarging the size-reduced image as a size of the first image, to generate a size-restored image; and cutting the size-restored image according to the change of the viewing angle, to generate a temporary viewing image.

16. The video decoding system according to claim 15, wherein the at least one processor is further configured for:

in response to the extended viewing angle partially covering the change of the viewing angle, fusing the part of the first image and the temporary viewing image, to generate a fused viewing image.

17. The video decoding system according to claim 13, wherein the at least one processor is further configured for:

cutting the all of the first image according to the viewing angle, to generate the part of the first image, wherein the extended viewing angle corresponding to the part of the first image is larger than the viewing angle.

* * * * *